US012769914B2

(12) United States Patent
Chen et al.

(10) Patent No.: US 12,769,914 B2
(45) Date of Patent: Oct. 20, 2026

(54) MARGIN CALIBRATION METHOD AND MARGIN CALIBRATION SYSTEM FOR STATIC TIMING ANALYSIS

(71) Applicant: REALTEK SEMICONDUCTOR CORP., Hsinchu (TW)

(72) Inventors: Ying-Chieh Chen, Hsinchu (TW); Mei-Li Yu, Hsinchu (TW); Yu-Lan Lo, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 883 days.

(21) Appl. No.: 18/150,767

(22) Filed: Jan. 5, 2023

(65) Prior Publication Data

US 2023/0222277 A1 Jul. 13, 2023

(30) Foreign Application Priority Data

Jan. 7, 2022 (TW) .................................. 111100661

(51) Int. Cl.
*G06F 30/3315* (2020.01)
*G06F 119/12* (2020.01)

(52) U.S. Cl.
CPC ...... *G06F 30/3315* (2020.01); *G06F 2119/12* (2020.01)

(58) Field of Classification Search
CPC ......................... G06F 30/3315; G06F 2119/12
See application file for complete search history.

(56) References Cited

U.S. PATENT DOCUMENTS 7,958,478 B2 6/2011 Saito et al.
7,992,114 B1 8/2011 Adams et al.

FOREIGN PATENT DOCUMENTS

CN 101344898 A 1/2009
CN 113343629 A 9/2021

*Primary Examiner* — Jack Chiang
*Assistant Examiner* — Aric Lin
(74) *Attorney, Agent, or Firm* — Li & Cai Intellectual Property (USA) Office

(57) ABSTRACT

A margin correction method and a margin correction system for static timing analysis are provided. The margin calibration method includes: measuring dies on a to-be-tested chip with a target circuit to obtain performance data records; obtaining simulation data records for simulating performances of the dies; executing a static timing analysis (STA) tool to obtain timing analysis results; statistically calculating a simulation process corner based on the timing analysis results; obtaining a measurement process corner based on the performance data records; establishing a statistical model that defines a margin as a difference between the measurement process corner and the simulation process corner; substituting the timing analysis results and the measurement process corner into the statistical model and execute a model fitting algorithm, for fitting the statistical model to a target model to obtain the margin; and obtaining calibrated timing analysis results.

18 Claims, 6 Drawing Sheets

MARGIN CALIBRATION METHOD AND MARGIN CALIBRATION SYSTEM FOR STATIC TIMING ANALYSIS

CROSS-REFERENCE TO RELATED PATENT APPLICATION

This application claims the benefit of priority to Taiwan Patent Application No. 111100661, filed on Jan. 7, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a calibration method and a calibration system, and more particularly to a margin calibration method and a margin calibration system for static timing analysis.

BACKGROUND OF THE DISCLOSURE

The importance of static timing analysis (STA) in integrated circuit (IC) mass production is generally demonstrated through the following two aspects:

(1) Operating speed of a chip: when an assessment of the actual operating speed is accurate, it can determined whether a chip complies with its product specification.

(2) Yield of a chip: since in general the yield of the chip may decrease as the operating speed increases, accurate static timing analysis results can be used to monitor an actual yield when the chip speed is increased, so as to confirm whether the chip functions and is ready for mass production. However, when the static timing analysis results are inaccurate, it cannot be relied on as to whether the chip can, after the chip speed is increased, function and ready for mass production. During manufacturing, this can lead to the chip speed being lowered for conservative purpose. However, such a reduction in chip speed results in worse chip performance and power consumption and area (i.e., PPA) than what can actually be achieved by the chip, thus resulting in increased costs.

In a margin estimation that uses the existing STA method, a fab end provides, according to physical disturbance characteristics and empirical rules for mass production of transistors, a margin to a design end, which can be used in the STA for circuit design. The aim is to obtain more accurate results when analyzing the circuit.

Since the margin is obtained based on the transistor level, when the margin is applied to the design logic level, there will be errors due to different analysis and application conditions, which may cause the analysis results to either be more optimistic or more pessimistic. When the analysis results are too optimistic, a drop in yield may be foreseen. Conversely, when the analysis results are too pessimistic, the PPA can be expected to be worse than what can realistically be achieved, thus resulting in increased costs.

SUMMARY OF THE DISCLOSURE

In response to the above-referenced inadequacies, the present disclosure provides a margin correction method and a margin correction system for static timing analysis that are capable of obtaining an accurate margin.

In one aspect, the present disclosure provides a margin calibration method for static timing analysis, and the margin calibration method includes: measuring performance on a plurality of dies on a to-be-tested chip with a target circuit to obtain a plurality of performance data records of critical paths of the plurality of dies; obtaining a plurality of simulation data records for simulating performances of the plurality of dies, respectively; executing a static timing analysis (STA) tool to perform static timing analysis on the target circuit according to the simulation data records, for obtaining a plurality of timing analysis results corresponding to the critical paths of the plurality of dies; statistically calculating a simulation process corner based on the plurality of timing analysis results; obtaining a measurement process corner based on the plurality of performance data records; establishing a statistical model that defines a margin based on a difference between the measurement process corner and the simulation process corner; substituting the plurality of timing analysis results and the measurement process corner into the statistical model and executing a model fitting algorithm for fitting the statistical model to a target model for obtaining the margin, wherein the target model defines a first function and a second function that are equal, the first function being a function of the measurement process corner, and the second function being a function of the timing analysis result; and executing the STA tool to perform static timing analysis on the target circuit according to the plurality of simulation data records and the margin, so as to obtain a plurality of calibrated timing analysis results corresponding to the plurality of dies.

In another aspect, the present disclosure provides a margin calibration system for static timing analysis, and the margin calibration system includes a memory and a processor. The memory is configured to store a plurality of computer-executable instructions. The processor is electrically coupled to the memory, and configured to retrieve and execute the computer-executable instructions to perform: measuring performance on a plurality of dies on a to-be-tested chip with a target circuit to obtain a plurality of performance data records of critical paths of the plurality of dies; obtaining a plurality of simulation data records for simulating performances of the plurality of dies, respectively; executing a static timing analysis (STA) tool to perform static timing analysis on the target circuit according to the simulation data records, for obtaining a plurality of timing analysis results corresponding to the critical paths of the plurality of dies; statistically calculating a simulation process corner based on the plurality of timing analysis results; obtaining a measurement process corner based on the plurality of performance data records; establishing a statistical model that defines a margin based on a difference between the measurement process corner and the simulation process corner; substituting the plurality of timing analysis results and the measurement process corner into the statistical model and executing a model fitting algorithm, for fitting the statistical model to a target model for obtaining the margin, in which the target model defines a first function and a second function that are equal, the first function being a function of the measurement process corner, and the second function being a function of the timing analysis result; and executing the STA tool to perform static timing analysis on the target circuit according to the plurality of simulation data records and the margin, so as to obtain a plurality of calibrated timing analysis results corresponding to the plurality of dies.

Therefore, in the margin calibration method and the margin calibration system for static timing analysis provided by the present disclosure, an optimal margin can be estimated by numerical optimization for STA, thereby saving computing and measurement resources, improving yield, and shortening development times.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
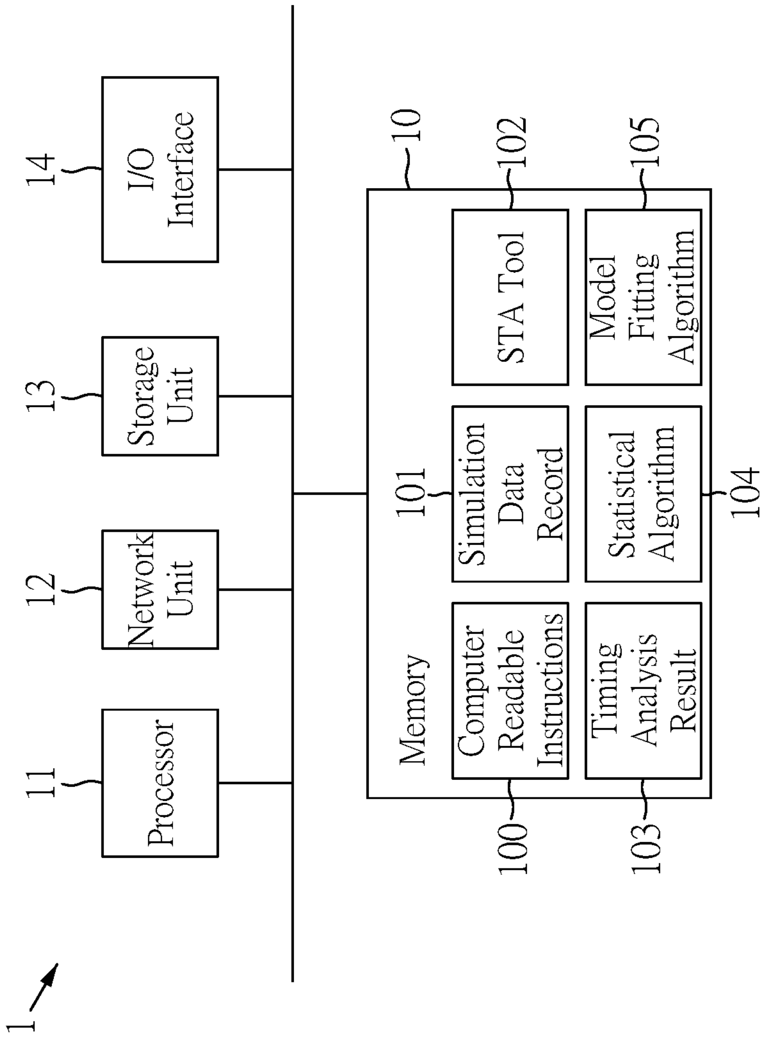
FIG. 1 is a functional block diagram of a margin calibration system for static timing analysis according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

FIG. 1 is a functional block diagram of a margin calibration system for static timing analysis according to one embodiment of the present disclosure; Referring to FIG. 1, one embodiment of the present disclosure provides a margin calibration system 1 for static timing analysis, and the margin calibration system 1 includes a memory 10, a processor 11, a network unit 12, a storage unit 13 and an input/output (I/O) interface 14. The aforementioned elements can communicate with each other through, for example, but not limited to, a bus 15.

The memory 10 is any storage device that can be configured to store data, such as, but not limited to, a random access memory (RAM), a read only memory (ROM), a flash memory, a hard disk or other storage device that can be configured to store data. The memory 10 is configured to store at least a plurality of computer readable instructions 100. In one embodiment, the memory 10 can also be configured to store temporary data that are generated when operations are performed by the processor 11.

The processor 11 is electrically coupled to the memory 10, and is configured to access computer-readable instructions 100 from the memory 10, so as to control components in the optimizing device 1 to perform functions of the optimizing device 1.

The network unit 12 is configured to perform network access under a control of the processor 11. The storage unit 13 can be, for example, but not limited to, a magnetic disk or an optical disk, to store data or instructions under the control of the processor 11. The input/output (I/O) interface 14 can be operated by a user to communicate with the processor 11 in order to input and output data.

Figure 2:
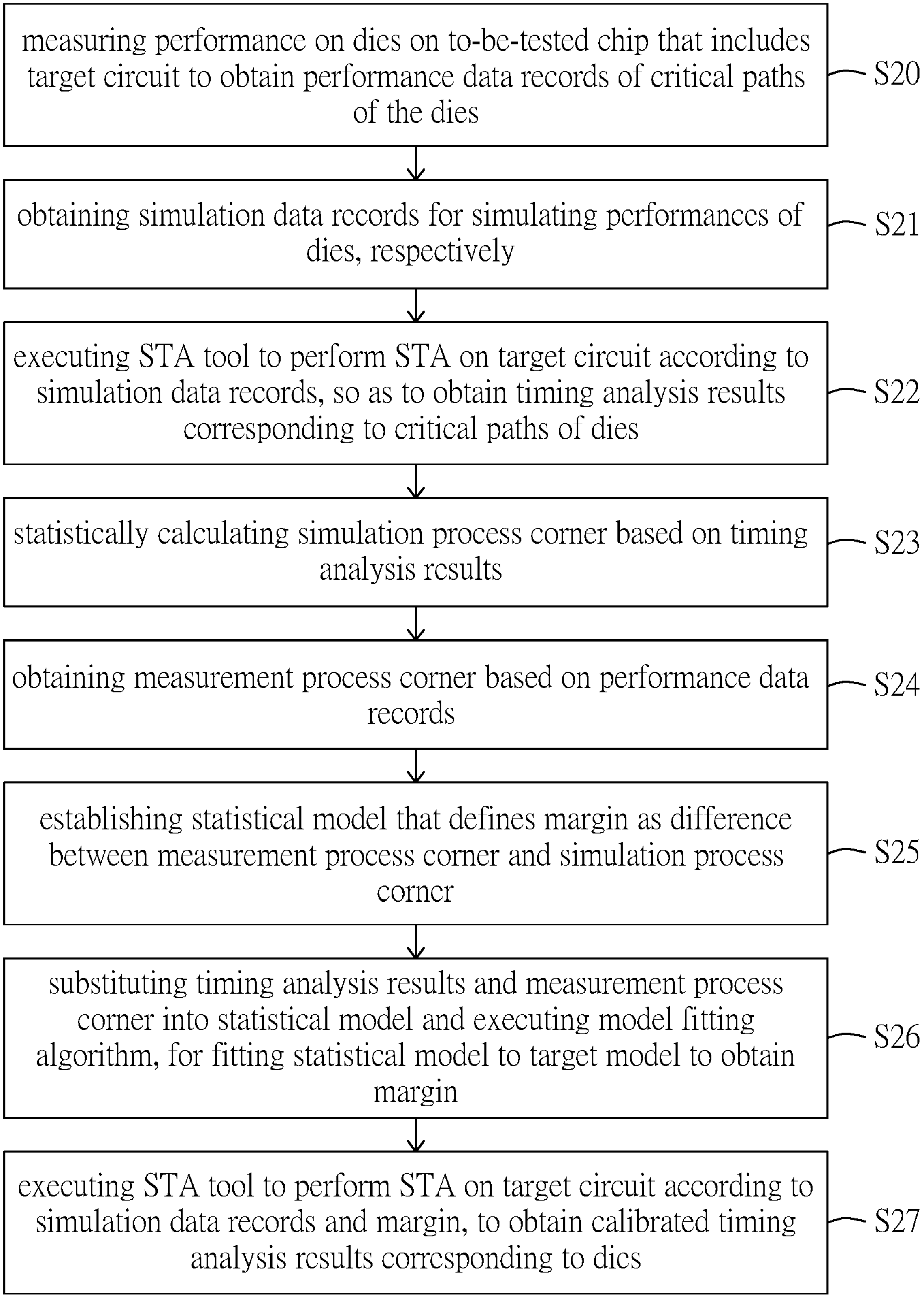
FIG. 2 is a flowchart of a margin correction method for static timing analysis according to one embodiment of the present disclosure.

FIG. 2 is a flowchart of a margin correction method for static timing analysis according to one embodiment of the present disclosure. FIG. 2 provides a margin correction method, the margin correction method can be applied to the margin calibration system 1 shown in FIG. 1, or can be implemented by other hardware components such as databases, general processors, computers, servers, or other unique hardware devices with particular logic circuits or apparatus with particular functions, in which, for example, codes and the processors/chips may be integrated into a unique hardware. In more detail, the margin calibration method can be implemented using a computer program to control each of the elements of the margin calibration system 1. The computer program may be stored in a non-transitory computer-readable storage medium, such as a ROM, the flash memory, floppy disks, the hard disks, the optical disks, flash drives, magnetic tapes, network-accessible databases or a computer-readable recording medium with the same functions in which those skilled in the art can easily contemplate.

Referring to FIG. 2, which is a flowchart of a margin correction method for static timing analysis according to one embodiment of the present disclosure, the margin calibration method includes the following steps.

Step S20: measuring performance on a plurality of dies on a to-be-tested chip that includes a target circuit to obtain a plurality of performance data records of critical paths of the plurality of dies.

Figure 3:
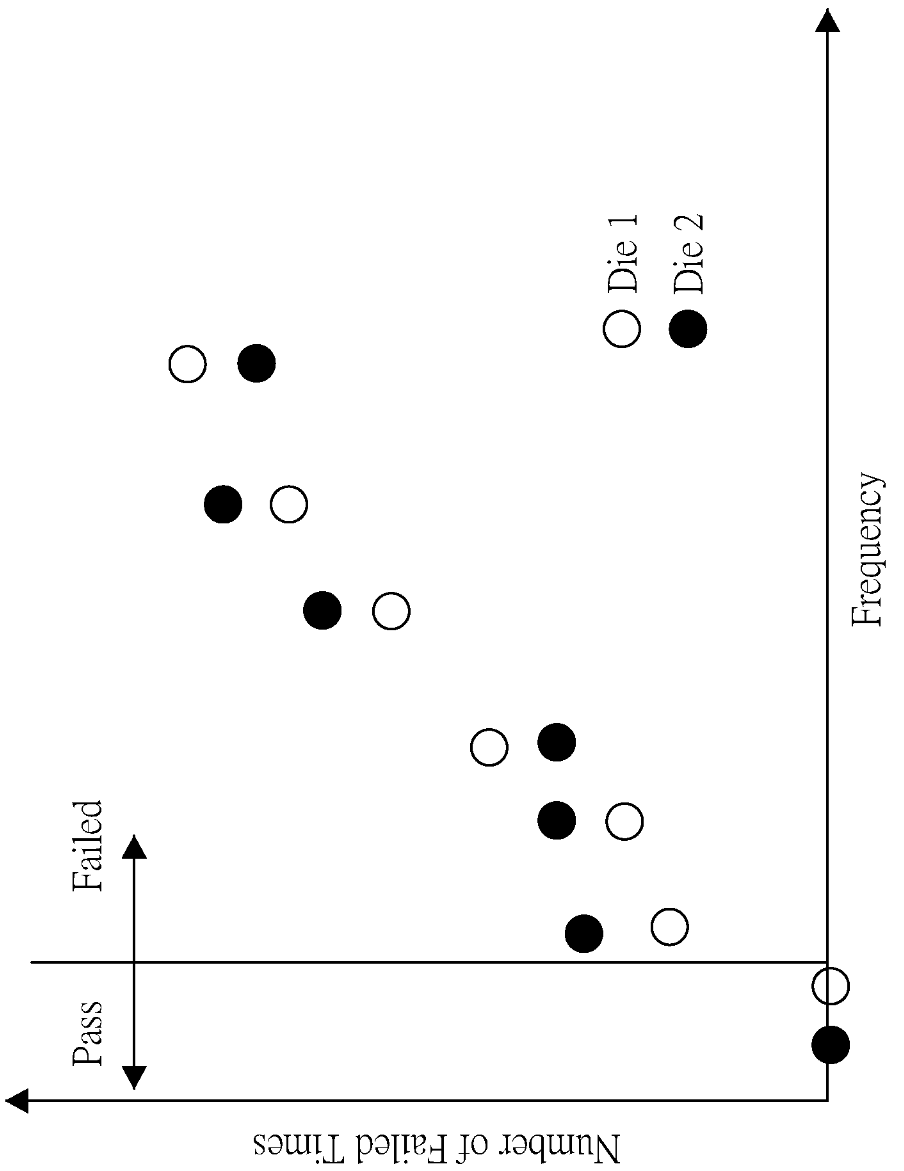
FIG. 3 is a plot diagram of the number of failed times versus frequency for different dies according to one embodiment of the present disclosure.

For example, signal sources with different frequencies can be input to the to-be-tested chip through a network analyzer to measure operating frequencies of the plurality of dies, and then a plurality of measured minimum passing frequencies of the dies can be obtained as the plurality of performance data records. Reference can be made to FIG. 3, which is a plot diagram of the number of failed times versus frequency for different dies according to one embodiment of the present disclosure. In detail, an operating frequency of each die (such as die 1, die 2) on the chip can be tested with different operating frequencies. When the operating frequency reaches a certain level, some of the dies may not be able to operate, as shown in FIG. 3. The operating frequency that makes the dies inoperative is regarded as a failure frequency, and the operating frequency before the failure occurs is taken as the maximum passing frequency. Next, after obtaining multiple ones of the maximum passing frequencies of the dies, the minimum among the maximum passing frequencies is identified and taken as the minimum passing frequency.

Step S21: obtaining a plurality of simulation data records for simulating performances of the plurality of dies, respectively.

The simulation data records 101 represent relevant data of the target circuit that are predetermined to be applied with the static timing analysis, the simulation data records 101 can be provided by the fab end, and can be, for example, model parameters of a transistor, including parameters such as a length, a width, an oxide layer thickness, and an electrical conductivity of the transistor.

Step S22: executing a static timing analysis (STA) tool to perform static timing analysis on the target circuit according to the simulation data records, so as to obtain a plurality of timing analysis results corresponding to the critical paths of the plurality of dies.

The static timing analysis is known to those skilled in the art and used for calculating and predicting timings of digital circuits in an integrated circuit design, so as to measure delays of a circuit in different operation stages, and to test performance of the circuit at a specified operating speed.

For example, in one embodiment of the present disclosure, an integrated circuit design of the target circuit can include a plurality of signal transmission paths, and after the static timing analysis is performed (for example, the static timing analysis tool 102 is executed by the processor 11, and the target circuit is analyzed according to the simulation data record 101), the path that causes the largest signal transmission delay among these signal transmission paths is regarded as a critical path. In this step, relevant information of the critical path is obtained by simulation and regarded as a timing analysis result 103, which can be stored in the memory 10.

Step S23: statistically calculating a simulation process corner based on the timing analysis results.

In this step, the static timing analysis can be performed on the target circuit to obtain a plurality of setup times for multiple ones of the critical paths of the plurality of dies.

The setup time represents the minimum amount of time a data signal should be held stable before a rising edge of an input clock signal occurs, and the setup time is determined by a clock period of the clock signal, an uncertainty of the clock signal, and slack.

Slack is a difference between actual time used and time required for an integrated circuit design, and is a term that indicates whether the integrated circuit design meets a timing condition. A positive slack represents that the timing condition is met (slack of timing), and a negative timing slack means that the timing condition is not met (a lack of timing).

After the setup times are obtained, these setup times can be converted into a plurality of simulation minimum passing frequencies according to the following equation (1).

$$\text{Simulation minimum passing frequency} = [1/(\text{clock period of clock signal} - \text{uncertainty of clock signal} - \text{slack})] \quad \text{Equation (1);}$$

Figure 4:
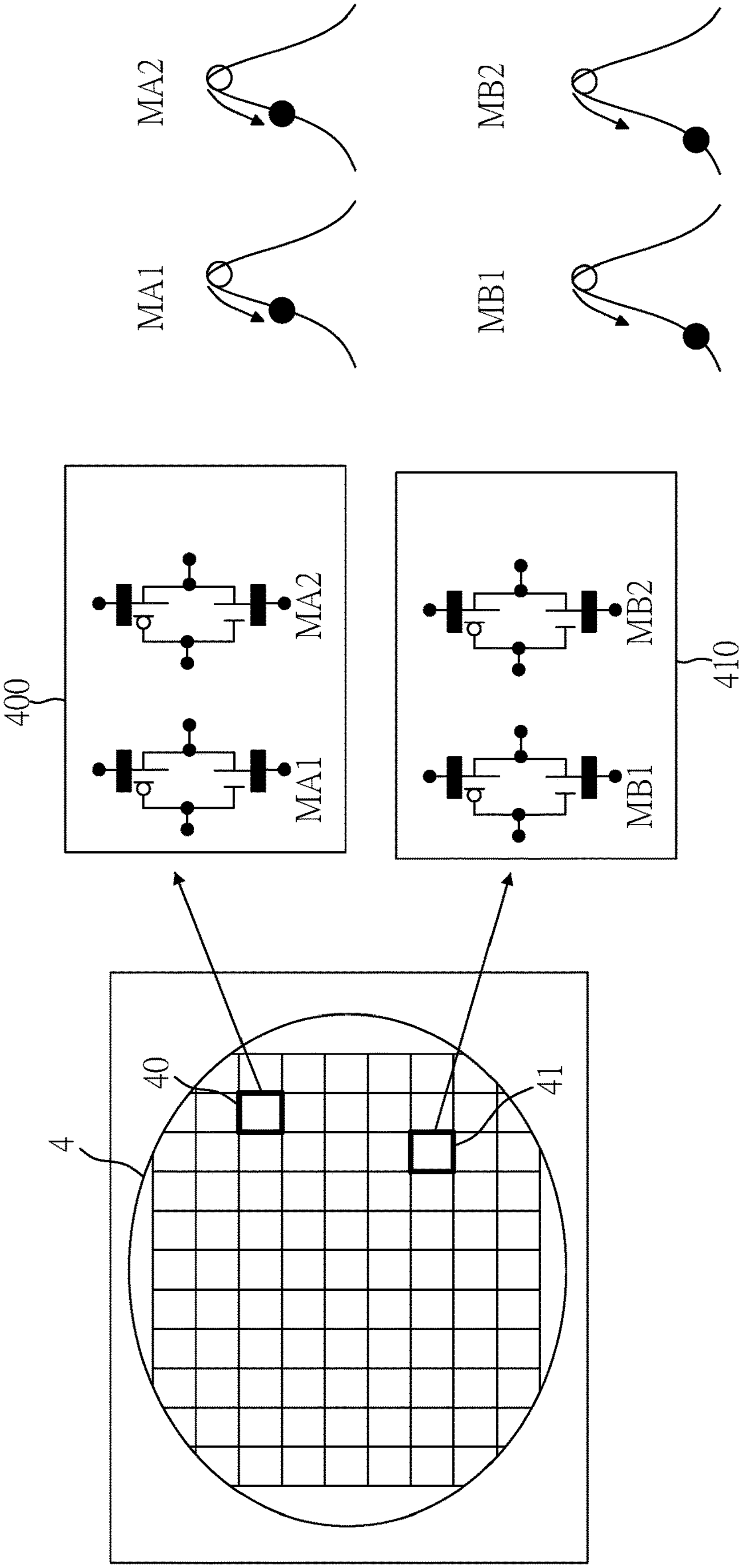
FIG. 4 is a schematic diagram of global statistics according to the present disclosure.

A statistical algorithm 104 can then be executed by the processor 11 to perform statistics on the simulated process corners and the measured process corners. In this case, the statistics include global statistics and local statistics. Reference is made to FIG. 4, which is a schematic diagram of global statistics according to the present disclosure. As shown in FIG. 4, the purpose of the global statistics is to find out common characteristics that can be used to represent all dies of all chips in a wafer 4. For example, the wafer 4 can include a chip 40 and a chip 41, and the chip 40 can include a die 400, and the chip 41 can include a die 410. If an analysis using the global statistics are performed on the chip 40, a model can be established that can be used to represent the characteristics of all transistors MA1 and MA2 in the die 400 of the chip 40, as shown on the right side of FIG. 4. Similarly, if an analysis using the global statistics are performed on the chip 41, a model can be established that can be used to represent the characteristics of all transistors MB1 and MB2 in the die 410 of the chip 41.

Therefore, the global statistics can be represented, for example, by the following equation (2):

$$\text{Global corner} = \mu(\text{die}_i) \quad \text{Equation (2);}$$

where global corner represents the global process corner, $\mu(\text{die}_i)$ represents an average of the process corners of i dies in the same chip, and the process corners can be obtained by making measurements (such as step S20) or can be obtained by performing a simulation (such as step S21 to S23).

Therefore, when the simulation process corners need to be extracted from the timing analysis results, these simulation minimum passing frequencies can be averaged according to the above-mentioned global statistics, so as to obtain a simulation global process corner.

Figure 5:
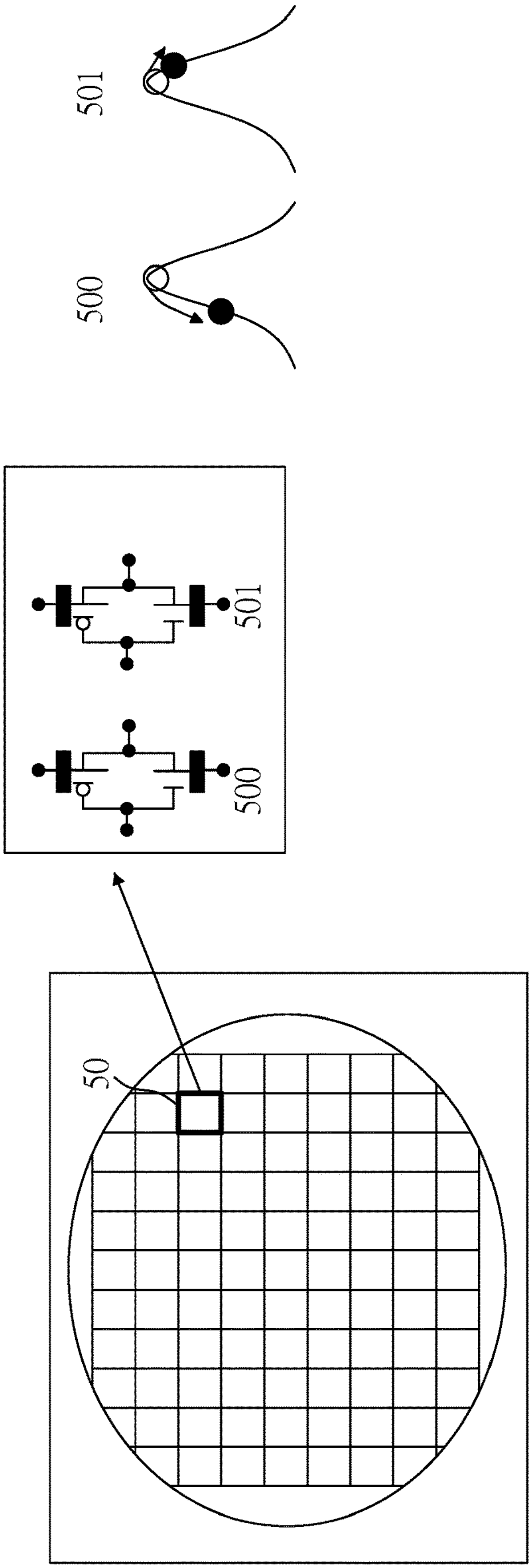
FIG. 5 is a schematic diagram of local statistics according to the present disclosure.

Reference is made to FIG. 5, which is a schematic diagram of local statistics according to the present disclosure. As shown in FIG. 4, the purpose of the global statistics is to find out a variation degree that can be used to represent the dies with the same integrated circuit design in a chip 50. For example, the chip 50 can include a die 500 and a die 501. If the local statistics are performed on the chip 50, a model that can be used to represent a variation degree between the die 500 and the die 501 with the same integrated circuit design in the chip 50 is found, as shown on the right side of FIG. 5.

Therefore, the local statistics can be represented, for example, by the following equation (3):

$$\text{Local corner} = \sigma(\text{die}_i) = \sigma(\text{Die}_{1\_i} - \text{Die}_{2\_i})/2^{0.5} \quad \text{Equation (3);}$$

where local corner represents the local process corner, $\sigma(\text{die}_i)$ represents the variation of the process parameters of i dies in the same wafer, and the process parameters can be obtained by measurement (such as step S20) or simulation (such as steps S21 to S23).

A statistical derivation of equation (3) is as follows.

Let $N(\mu, \sigma)$ be a normal distribution function with mean $\mu$ and variance $\sigma$.

Let X1_i be a first process corner in an i-th die and satisfy the following equation (4):

$$X_{1\_i}=N_{1\_i}(\mu_{global\_1},\mu_{global,1})+N_{1\_i}(\mu_{local\_1},\sigma_{local\_1}) \quad \text{Equation (4);}$$

Let X2_i be a second process corner in the i-th die and satisfy the following equation (5):

$$X_{2\_i}=N_{1\_i}(\mu_{global\_2},\sigma_{global\_2})+N_{2\_i}(\mu_{local\_2},\sigma_{local\_2}) \quad \text{Equation (5);}$$

Random first and second process corners are subtracted, and a variance σ is taken as shown in the following equation (6):

$$\sigma^2(X_{1\_i}-X_{2\_i})=\sigma^2\{[N_{1\_i}(\mu_{global\_1},\mu_{global\_1})+N_{1\_i}(\mu_{local\_1},\sigma_{local\_1})]-[N_{1\_i}(\mu_{global\_2},\sigma_{global\_2})+N_{2\_i}(\mu_{local\_2},\sigma_{1ocal\_2})]\} \quad \text{Equation (6);}$$

Since global characteristics are the same in the same die, $N_{1\_i}(\mu_{global\_1},\sigma_{global\_1})=N_{1\_i}(\mu_{global\_2},\sigma_{global\_2})$.

Next, the equation (6) can be expressed as the following equation (7):

$$\sigma^2(X_{1\_i}-X_{2\_i})=\sigma^2_{local\_1}+\sigma^2_{local\_2}-2\mathrm{Cov}_{(local\_1,local\_2)} \quad \text{Equation (7);}$$

where the local variations are always the same: $\sigma^2_{local\_1}=\sigma^2_{local\_2}=\sigma^2_{local}$;

and $2\mathrm{Cov}_{(local\_1,\ local\_2)}=0$;

Therefore, it can be obtained that $\sigma^2_{local}=\sigma^2(X_{1\_i}-X_{2\_i})/2$, and $\sigma_{local}=\sigma(X_{1\_i}-X_{2\_i})/2^{0.5}$.

Therefore, taking a conversion of the minimum simulation process corner as an example, when the simulation process corner need to be extracted from the timing analysis results, based on the above-mentioned local statistics, simulation minimum passing frequencies corresponding to the dies with the relationship of paired design can be extracted and subtracted two by two to calculate a variance, which is then divided by a statistical coefficient (that is, $2^{0.5}$ obtained by the above derivation) to obtain a local simulation process corner.

Step S24: obtaining a measurement process corner based on the plurality of performance data records.

In this step, the aforementioned global statistics and local statistics can be used to average these performance data records to obtain a global measurement process corner (global corner), and the performance data records corresponding to the dies with the relationship of paired design are extracted and subtracted two by two to calculate a variance, which is then divided by the statistical coefficient to obtain a local measurement process corner.

In one embodiment of the present disclosure, the performance data records for performing the global statistics and the local statistics are the minimum passing frequencies obtained in step S20.

Step S25: establishing a statistical model that defines a margin as a difference between the measurement process corner and the simulation process corner.

In this step, the statistical model can include a global statistical model and a local statistical model.

The global statistical model is defined as follows:

Global margin=|measurement global process corner−simulation global process corner|;

The local statistical model is defined as follows:

Local margin=|measurement local process corner−simulation global process corner|.

Step S26: substituting the plurality of timing analysis results and the measurement process corner into the statistical model and executing a model fitting algorithm, so as to fit the statistical model to a target model to obtain the margin. For example, the processor 11 can be configured to execute a model fitting algorithm 105, and the target model is defined as shown in the following equation (8):

$$\text{fMeasure}=\text{fSimulation} \quad \text{Equation (8);}$$

where fMeasure is a function of measurement process corner, and fSimulation is a function of timing analysis result.

Therefore, the target model can be further obtained as fMeasure−fSimulation=0.

Therefore, the global statistical model and the local statistical model can be respectively fitted with the target model to obtain the global margin and the local margin, respectively.

For example, the measurement global process corner and the simulation global process corner can be substituted into the global statistical model to fit the global statistical model to the target model (fMeasure_global=fSimulation_global), so as to obtain the global margin.

fMeasure_global is a function of the measurement global process corner, and fSimulation_global is a function of the simulation global process corner.

Alternatively, the measurement local process corner and the simulation local process corner can be substituted into the local statistical model, so as to fit the local statistical model to the target model (fMeasure_local=fSimulation_local) to obtain the local margin.

fMeasure_local is a function of the measurement local process corner, and fSimulation_local is a function of simulation local process corner.

Figure 6:
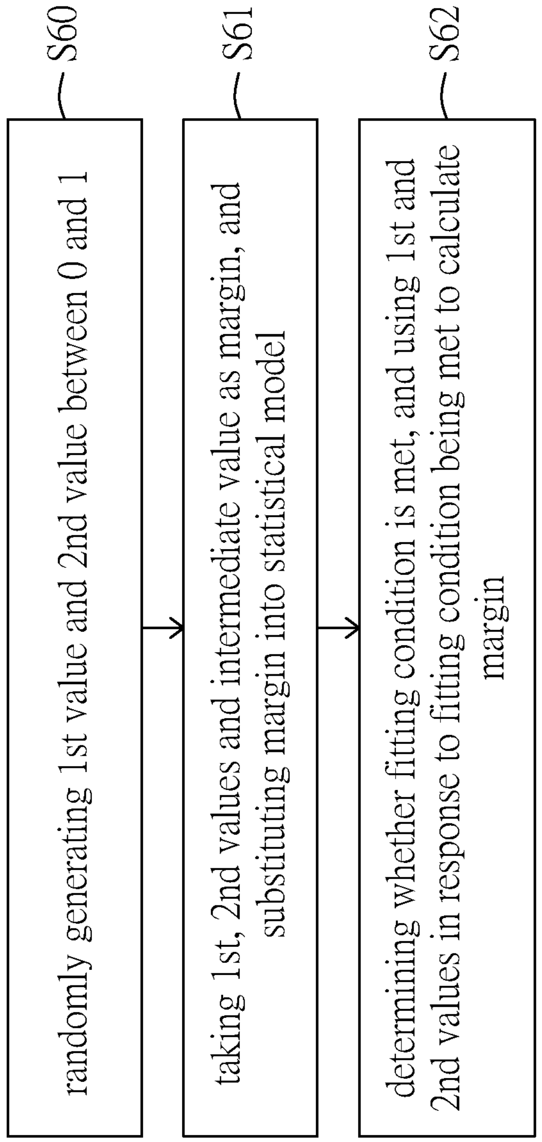
FIG. 6 is a flowchart of a bisection method according to one embodiment of the present disclosure.

For example, the model fitting algorithm can utilize a bisection method, for example. Reference is made to FIG. 6, which is a flowchart of the bisection method according to one embodiment of the present disclosure.

As shown in FIG. 6, the bisection method can include:

Step S60: randomly generating a first value and a second value between 0 and 1.

Step S61: taking the first value, the second value and an intermediate value between the first value and the second value as the margin, and substituting the margin into the statistical model, the first value being greater than the second value.

For example, the aforementioned statistical model is simplified to a function f(margin) of the margin, the first value, the second value and the intermediate value are respectively denoted as STAp_h, STAp_l and STAp_m, and STAp is a to-be-obtained margin that satisfies f(STAp)=0.

At this time, STAp_h and STAp_l between 0 and 1 are randomly generated and substituted into f(STAp_h), f(STAp_l) and f(STAp_m) to calculate values of f(STAp_h), f(STAp_l) and f(STAp_m), respectively.

Step S62: determining whether a fitting condition is met, and using the first value and the second value in response to the fitting condition being met to calculate the margin.

For example, whether f(STAp_h)*f(STAp_m) is less than 0 or not can be firstly determined. If so, STAp_l is replaced with STAp_m, if not, STAp_h is replaced with STAp_m, determining whether f(STAp_h)−f(STAp_l) is less than or equal to 95% confidence interval as the fitting condition.

If f(STAp_h)−f(STAp_l) is greater than the 95% confidence interval, the bisection method returns to step S60.

If f(STAp_h)−f(STAp_l) is less than or equal to the 95% confidence interval, the margin is calculated according to STAp_h and STAp_l at this time.

Step S27: executing the STA tool to perform static timing analysis on the target circuit according to the plurality of simulation data records and the margin, so as to obtain a plurality of calibrated timing analysis results corresponding to the plurality of dies.

Advantages of using the margin calibration method and the margin calibration system for static timing analysis provided by the present disclosure can include those set forth in the following list:

(1) High applicability: the margin calibration method of the present disclosure can perform margin calibration according to different types of circuits and components. For example, the margin correction method can be applied to the design of CPUs with ultra-high-speed requirements or automotive chips with ultra-high yield requirements, or can be applied to transistors with high, medium, and low threshold voltages.

(2) Saving computing resources: the optimal STA parameters estimated by the numerical optimization method can reduce verification time using the existing simulation programs (such as SPICE, Monte Carlo, etc.) having huge computational loads.

(3) Saving measurement resources: the use of statistical derivation and regression analysis can reduce the number of hardware measurements to save a lot of time and human resources.

(4) High yield can be achieved, so as to afford high reliability.

(5) Shortened development schedule: before a mass production of the circuit, the calibrated margin can be obtained first, which can effectively shorten the development schedule and prevent repeated consumption of various resources from repeated modification of the circuit.

Beneficial Effects of the Embodiments

In conclusion, in the margin calibration method and the margin calibration system for static timing analysis provided by the present disclosure, an optimal margin can be estimated by numerical optimization for STA, thereby saving computing and measurement resources, improving yield, and shortening development times.

The aforementioned description for the composite nanometer material structure 2 of the first embodiment is merely an example, and is not meant to limit the scope of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A margin calibration method for static timing analysis, the margin calibration method comprising:

measuring performance on a plurality of dies on a to-be-tested chip with a target circuit to obtain a plurality of performance data records of critical paths of the plurality of dies;

obtaining a plurality of simulation data records for simulating performances of the plurality of dies, respectively;

executing a static timing analysis (STA) tool to perform static timing analysis on the target circuit according to the simulation data records, for obtaining a plurality of timing analysis results corresponding to the critical paths of the plurality of dies;

statistically calculating an average of the plurality of timing analysis results;

obtaining an average of the plurality of performance data records;

establishing a statistical model that defines a margin based on a difference between the average of the plurality of performance data records and the average of the plurality of timing analysis results;

substituting the plurality of timing analysis results and the average of the plurality of performance data records into the statistical model and executing a model fitting algorithm for fitting the statistical model to a target model for obtaining the margin, wherein the target model defines a first function and a second function that are equal, the first function being a function of the average of the plurality of performance data records, and the second function being a function of the timing analysis result; and executing the STA tool to perform static timing analysis on the target circuit according to the plurality of simulation data records and the margin, so as to obtain a plurality of calibrated timing analysis results corresponding to the plurality of dies.

2. The margin calibration method according to claim 1, wherein the step of measuring the plurality of dies to obtain the plurality of performance data records further includes:

measuring operating frequencies of the plurality of dies to obtain a plurality of minimum passing frequencies of the plurality of dies as the plurality of performance data records.

3. The margin calibration method according to claim 2, wherein the step of obtaining the plurality of timing analysis results corresponding to the plurality of die includes:

performing static timing analysis on the target circuit to obtain a plurality of setup times of the plurality of dies; and converting the plurality of setup times into a plurality of simulated minimum passing frequencies.

4. The margin calibration method according to claim 3, wherein the step of calculating the average of the plurality of performance data records further includes:

averaging the plurality of performance data to obtain a global measurement process corner; and extracting the performance data records that correspond to the dies and that have a paired design, subtracting the performance data records having the paired design in a two-by-two manner and calculating a variance thereof, and then dividing the variance by a statistical coefficient to obtain a local measurement process corner.

5. The margin calibration method according to claim 4, wherein the statistical coefficient is 20.5.

6. The margin calibration method according to claim 4, wherein the step of statistically calculating the average of the plurality of timing analysis results further includes:

averaging the simulation minimum passing frequencies to obtain a global simulation process corner; and extracting the simulation minimum passing frequencies that correspond to the dies having the paired design, subtracting the simulated minimum passing frequencies having the paired design in the two-by-two manner and calculating a variance thereof, and then dividing the variance by the statistical coefficient to obtain a local simulation process corner.

7. The margin calibration method according to claim 6, wherein the step of establishing the statistical model includes:

establishing a first statistical model that defines a global margin as a difference between the measurement global process corner and the simulation global process corner; and establishing a second statistical model that defines a local margin as a difference between the measurement local process corner and the local simulation process corner.

8. The margin calibration method according to claim 7, wherein the model fitting algorithm includes:

substituting the measurement global process corner and the simulation global process corner into a first statistical model to fit the first statistical model to a first target model, so as to obtain the global margin, wherein the first target model defines a third function and a fourth function that are equal, the third function being a function of the measurement global process corner, and the fourth function being a function of the simulation global process corner; and substituting the measurement local process corner and the simulation local process corner into a second statistical model to fit the second statistical model to a second target model, so as to obtain the local margin, wherein the second target model defines a fifth function and a sixth function that are equal, the fifth function being a function of the measurement local process corner, and the sixth function being a function of the simulation local process corner.

9. The margin calibration method according to claim 1, wherein the model fitting algorithm further includes: fitting the statistical model to the target model by a bisection method, wherein the bisection method includes:

randomly generating, for multiple times, a first value and a second value between 0 and 1, and an intermediate value between the first value and the second value, and taking the first value, the second value and the intermediate value as the margin, and then substituting the margin into the statistical model, wherein the first value is greater than the second value; and determining whether a fitting condition is met, wherein, in response to the fitting condition being met, the first value and the second value are used to calculate the margin.

10. A margin calibration system for static timing analysis, the margin calibration system comprising:

a memory configured to store a plurality of computer-executable instructions; and a processor electrically coupled to the memory, wherein the processor is configured to retrieve and execute the computer-executable instructions to perform:

measuring performance on a plurality of dies on a to-be-tested chip with a target circuit to obtain a plurality of performance data records of critical paths of the plurality of dies;

obtaining a plurality of simulation data records for simulating performances of the plurality of dies, respectively;

executing a static timing analysis (STA) tool to perform static timing analysis on the target circuit according to the simulation data records, for obtaining a plurality of timing analysis results corresponding to the critical paths of the plurality of dies;

statistically calculating an average of the plurality of timing analysis results;

obtaining an average of the plurality of performance data records;

establishing a statistical model that defines a margin based on a difference between the average of the plurality of performance data records and the average of the plurality of timing analysis results;

substituting the plurality of timing analysis results and the average of the plurality of performance data records into the statistical model and execute a model fitting algorithm, for fitting the statistical model to a target model for obtaining the margin, wherein the target model defines a first function and a second function that are equal, the first function being a function of the average of the plurality of performance data records, and the second function being a function of the timing analysis result; and executing the STA tool to perform static timing analysis on the target circuit according to the plurality of simulation data records and the margin, so as to obtain a plurality of calibrated timing analysis results corresponding to the plurality of dies.

11. The margin calibration system according to claim 10, wherein the step of measuring the plurality of dies to obtain the plurality of performance data records further includes:

measuring operating frequencies of the plurality of dies to obtain a plurality of minimum passing frequencies of the plurality of dies as the plurality of performance data records.

12. The margin calibration system according to claim 11, wherein the step of obtaining the timing analysis results corresponding to the dies includes:

performing static timing analysis on the target circuit to obtain a plurality of setup times of the plurality of dies; and converting the plurality of setup times into a plurality of simulated minimum passing frequencies.

13. The margin calibration system according to claim 12, wherein the step of calculating the average of the plurality of performance data records further includes:

averaging the plurality of performance data to obtain a global measurement process corner; and extracting the performance data records that corresponding to the dies that have a paired design, subtracting the performance data records having the paired design in a two-by-two manner and calculating a variance thereof, and then dividing the variance by a statistical coefficient to obtain a local measurement process corner.

14. The margin calibration system according to claim 13, wherein the statistical coefficient is 20.5.

15. The margin calibration system according to claim 13, wherein the step of statistically calculating the average of the plurality of timing analysis results further includes:

averaging the simulation minimum passing frequencies to obtain a global simulation process corner; and extracting the simulation minimum passing frequencies that correspond to the dies and that have the paired design, subtracting the simulated minimum passing frequencies having the paired design in a two-by-two manner and calculating a variance thereof, and then dividing the variance by the statistical coefficient to obtain a local simulation process corner.

16. The margin calibration system according to claim 15, wherein the step of establishing the statistical model includes:

establishing a first statistical model that defines a global margin as a difference between the measurement global process corner and the simulation global process corner; and establishing a second statistical model that defines a local margin as a difference between the measurement local process corner and the local simulation process corner.

17. The margin calibration system according to claim 16, wherein the model fitting algorithm includes:

substituting the measurement global process corner and the simulation global process corner into a first statistical model to fit the first statistical model to a first target model, so as to obtain the global margin, wherein the first target model defines a third function and a fourth function that are equal, the third function being a function of the measurement global process corner, and the fourth function being a function of the simulation global process corner; and substituting the measurement local process corner and the simulation local process corner into a second statistical model to fit the second statistical model to a second target model, so as to obtain the local margin, wherein the second target model defines that a fifth function and a sixth function that are equal, the fifth function being a function of the measurement local process corner, and the sixth function being a function of the simulation local process corner.

18. The margin calibration system according to claim 10, wherein the model fitting algorithm further includes: fitting the statistical model to the target model by a bisection method, wherein the bisection method includes:

randomly generating, for multiple times, a first value and a second value between 0 and 1 and an intermediate value between the first value and the second value, and taking the first value, the second value and the intermediate value as the margin, and then substituting the margin into the statistical model, wherein the first value is greater than the second value; and determining whether a fitting condition is met, wherein, in response to the fitting condition being met, the first value and the second value are used to calculate the margin.

* * * * *